United States Patent [19]

Parker et al.

[11] Patent Number: 4,568,733
[45] Date of Patent: Feb. 4, 1986

[54] HIGH PERFORMANCE MIXED BISIMIDE RESINS AND COMPOSITES BASED THEREON

[75] Inventors: John A. Parker, Los Altos; Alvin H. Heimbuch, El Cerrito; Ming-ta S. Hsu; Timothy S. Chen, both of San Jose, all of Calif.

[73] Assignee: The United States of America as represented by the Administrator of the National Aeronautics and Space Administration, Washington, D.C.

[21] Appl. No.: 719,796

[22] Filed: Apr. 4, 1985

[51] Int. Cl.$^4$ .......................................... C08F 220/70
[52] U.S. Cl. .................................................... 526/262
[58] Field of Search .......................................... 526/262

[56] References Cited

U.S. PATENT DOCUMENTS

| 4,158,730 | 6/1979 | Baumann | 526/262 |
| 4,323,662 | 4/1982 | Oba | 525/281 |
| 4,463,147 | 7/1984 | Diethelm | 526/262 |

*Primary Examiner*—Paul R. Michl
*Attorney, Agent, or Firm*—Darrell G. Brekke; John R. Manning; Robert D. Marchant

[57] ABSTRACT

The present invention relates to mixed bismaleimide/biscitraconimide resins. Mixtures of the two resins produces materials which have better handling, processing or mechanical and thermal properties, particularly in graphite composites, than materials made with the individual resins. The mechanical strength of cured graphite composites prepared from a 1:1 copolymer of such bisimide resins is excellent at both ambient and elevated temperatures. The copolymer mixture provides improved composites which are lighter than metals and replace metals in many aerospace applications.

15 Claims, 1 Drawing Figure

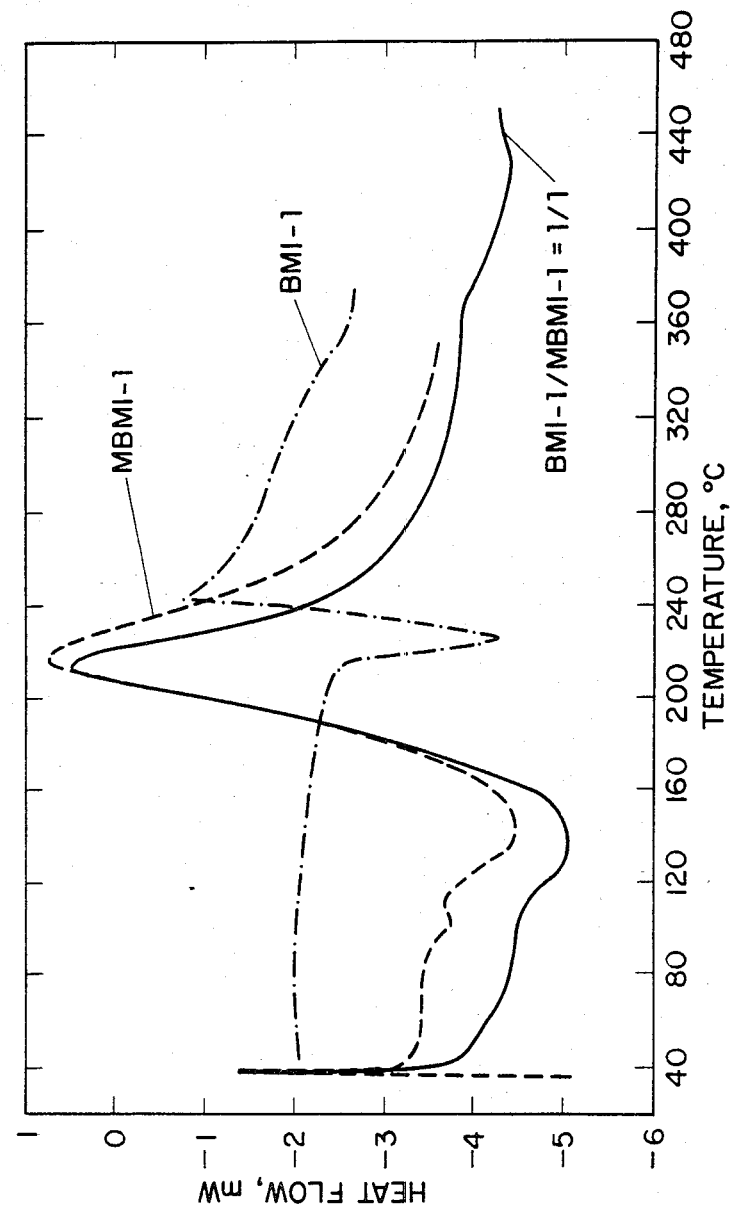

HIGH PERFORMANCE MIXED BISIMIDE RESINS AND COMPOSITES BASED THEREON

ORIGIN OF THE INVENTION

The invention described herein was made in the performance of work under a NASA contract and is subject to Public Law 96-517 (35 U.S.C. 200 et seq.). The contractor has not elected to retain title to the invention.

TECHNICAL FIELD

The present invention relates to aromatic bismaleimide and biscitraconimide resins, their advantageous copolymerization with one another, and the formation of reinforced composites and structures based on these copolymers.

BACKGROUND

Bisimides, such as the bismaleimides and their 3-methyl analogues; the biscitraconimides, are being increasingly used as matrix resins for fiber-reinforced composites, especially high-performance graphite fiber-reinforced composites. The resins are cured by a thermally induced addition reaction to give highly cross-linked, void-free network polymers having good physical properties with higher thermal stability, higher char yield, better fire resistance and lower water absorption than currently-used epoxy systems.

High performance graphite-fiber reinforced, organic matrix composites are considerably lighter than metals and are used to replace metals in many aerospace applications. Bismaleimides are one of several polymer candidates being examined for use as resin matrixes for fiber-reinforced composites usable at elevated temperatures. Low molecular weight bisimide prepolymers, end-capped with reactive maleimide rings are polymerizable thermally into highly cross-linked heat-resistant polymer networks without formation of troublesome or hazardous byproducts. A general discussion of this field is found in the following references: W.J. Gilwee et al., SAMPE Symposium, Vol. 16, p. 284 (1973); F. Grundschober et al., U.S. Pat. No. 3,380,964; A. Bergain et al., U.S Pat. No. 3,562,223; G.T. Kwiatkowski et al., J. Polym. Sci. Chem Ed. Vol. 13, p. 961 (1975).

However, there remain some problems with the bisimide-type resins: for example, difficult processing conditions, solvent retention in the prepregs, high melting point and high curing temperatures of the monomer, and brittleness of the final polymers because of the high cross-link density obtained in network polymers.

Recently, several modifications have been disclosed of bisimide-type resins that improve the resins' properties or their processibility. These include a hot-melt bismaleimide described by H.D. Stenzenberger, et al., SAMPE Symposium, Vol. 29, p. 1043 (1984) and the modification of bismaleimide with vinyl or allyl comounds to improve the cure temperature and toughness of the resin [See M.S. Hsu et al. SAMPE Symposium, Vol. 29, p. 1034 (1984) and J.J. King et al, SAMPE Symposium, Vol. 29, p. 392 (1984)].

In U.S. Pat. No. 4,269,966, Stenzenberger discloses novel polyimide prepolymers which are produced by reacting an unsaturated dicarboxylic acid imido acyl chloride with a difunctional amine to produce the corresponding acid amide. The condensation of these monomers is preferably performed in solution in a low boiling solvent. The resulting prepolymer is hardened and completely polymerized by heating, preferably between about 80 and 400° C. to produce a cross-linked, substantially infusible and insoluble polyimide resin. Stenzenberger generally discloses a number of the bisimides used in this invention, but does not disclose that mixtures of the specific bisimides give products which have enhanced physical and thermal properties as is found in the present invention.

Bonnard, in U.S. Pat. No. 3,627,780, discloses the preparation and use of bismaleimides. However, these bismaleimides do not have additional amide structures between the maleic acid moieties as is found in the present invention. In U.S. Pat. No. 2,745,841, Tawney et al., also discloses a number of bismaleimides which do not incorporate additional amide linkages between the maleic acid moieties.

Additional U.S. patents of general interest which disclose polyimide compositions having bismaleimide terminal groups include: U.S. Pat. Nos. 4,418,181 (to Monacelli), 3,883,609 (to Ladd), 3,887,582 (to Holub et al.), and 4,280,948 (to Darms et al.)

This body of art reflects the need for bisimide resin systems which exhibit improved processability and improved physical and mechanical properties as are described in the present invention.

STATEMENT OF THE INVENTION

It has been found in the present invention that the properties of aromatic bisimide resins and their curing conditions are substantially improved by using as resins an essentially equimolar mixture of the bismaleimide and the corresponding biscitraconimide resin. In one preferred embodiment, the resins are materials of General Formulae I and II,

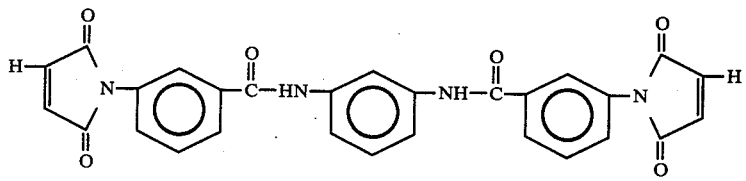

and

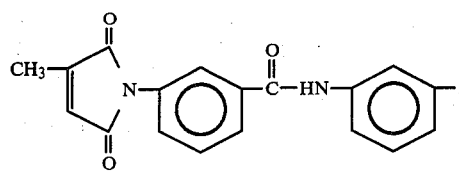 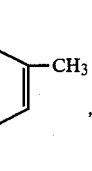 (II)

wherein the molar ratio of resin I to resin II is between about 2:1 and 1:2.

In another aspect, this invention relates to improved cured polymeric resins formed from an essentially equimolar mixture of bismaleimide and biscitraconimide such as the resins of General Formulae I and II.

In yet another aspect the invention relates to reinforced resin composites employing the cured mixed resin formed from mixtures of bismaleimide and biscitraconimide such as the resins of General Formulae I and II.

In still another aspect, the invention relates to primary and secondary structures made of these reinforced resin composites.

BRIEF DESCRIPTION OF THE DRAWINGS

The present invention will be described with reference being made to the accompanying drawing in which, The sole FIGURE is a differential scanning calorimeter plot of the relative melting and curing temperatures of a representative copolymer of this invention and the individual monomers thereof.

DETAILED DESCRIPTION OF THE INVENTION

In accord with the present invention, bisimide polymer systems having lower curing temperatures and better physical properties for the cured product are achieved by employing as resin an essentially equimolar mixture of an aromatic bismaleimide and the corresponding biscitraconimide.

As used herein the term "essentially equimolar" means a molar ratio of from about 2:1 to about 1:2. Preferred ratios are from about 1.5:1 to about 1:1.5 with best results generally being obtained at a ratio of about 1:1. It will be appreciated that the two resins that are mixed are large molecules that differ from one another by the presence of 2 CH₃'s or 2 H's. Thus, their weight ratios are for all intents and purposes the same as the molar ratios just recited.

The Resins

The resins employed as a mixture herein, are aromatic bismaleimides and aromatic biscitraconimides. Such materials are represented by General Structures III and IV respectively.

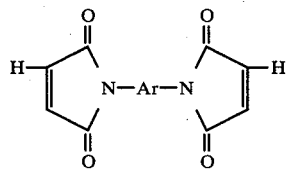 (III)

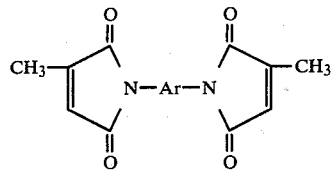 (IV)

wherein Ar is an arylene group. The arylene group Ar can be selected from simple hydrocarbon groups; such as phenylene, diphenylene, and diphenylene methane, alkyl-substituted diphenylenes and naphthalene, and the like. Ar groups can include substituted aromatic hydrocarbon groups as well such as diphenylsulfone, oxyphenylene and amide linked polyaromatics, for example, phenylene-benzamides, phenylenebisbenzamides, such as the m-phenylene bisbenzamide added via N,N'-m-phenylene-bis(m-aminobenzamide) and the like. Preferred aromatic linking groups include m-phenylene-bis(benzamide), i.e., and bis(phenylene)methane, i.e.,

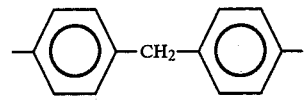

with the bisbenzamide being the most preferred Ar group such that the resins are represented by General Formulae I and II.

Preparation

The bismaleimide and biscitraconimide resins noted above can be prepared by the general reaction between two equivalents of maleic anhydride or citraconic anhydride with a bis-amino derivative of the Ar group followed by elimination of water.

The amino groups react with the anhydrides to yield the desired bisimide. This reaction is demonstrated in the Preparations and may be generally carried out in a dipolar aprotic solvent such as a ketone, methyl ethyl ketone, dimethyl ketone or the like or dimethylformamide (DMF), dimethylacetamide (DMAC), N-methylpyrollidone (NMP), or the like. This reaction is conducted at moderate temperature, i.e., ° C. to 75° C. Elimination of water can be effected using a water-elimination reagent such as acetic anhydride plus sodium acetate or the like under similar conditions, such as temperatures of from about 25° C. to about 85° C. Additional information on the preparation of bisimides may be found in the art, for example in U.S. Pat. No. 2,444,536 and in the art described herein in the background.

Copolymers

The copolymers of this invention are composed of mixtures of bismaleimide and biscitraconimide. The properties of the cured composite will depend in part on the relative amounts of the monomers.

As the proportion of citraconimide is increased, the product becomes less flame-resistant when fully cured, but easier to cure. As the proportion of citraconimide is increased, a more brittle, less amorphous, more crystalline product is obtained.

It is found that a good mix of physical properties is obtained between molar ratios of bismaleimide/biscitraconimide of between about 2:1 and 1:2. Better properties are obtained when the ratio is about 1:1. If desired, mixtures of two or more bismaleimides or biscitraconimides can be used.

Products and Composites

The resins of this invention find ready use as casting resins and especially as binders or substrates for reinforced composites. The reinforcement is generally a fiber and can be organic or inorganic and in organized or disorganized form, for example carbon fiber (i.e., graphite fiber), aramide fiber or glass fiber as yarns, fabrics, or felts; or such material as chopped fiber. Other materials known in the art as polymer reinforcements, for example boron nitride, and metal fibers, can be employed as well. Carbon fibers are the preferred reinforcement.

Conventional ratios of reinforcement to subtrate are employed, such as from about 0.5 to about 5 parts by weight of reinforcement per part of substrate.

Other materials such as fillers, pigments, antioxidants and the like can be added as well, if desired.

Copolymer Formation and Cure

It is an important advantage of the present copolymers that their cure conditions are far less severe than those employed with the bismaleimides alone. Thus, it is less expensive to cure the present materials and less distortion occurs during cure. It is also an important advantage that the present copolymers, as they cure, do not give off volatile components which can generate voids and decrease the strength of the final cured products.

Copolymers are formed by admixing the one or more bismaleimides and biscitraconimides in the desired ratio and heating. This can be done with a hot melt process with the neat bismaleimide and biscitraconimide. The mixing can also be carried out in a polar aprotic organic solvent, such as dimethylformamide (DMF), dimethylacetamide (DMAC), dichloroethane, ketones such as acetone, methyl ethyl ketone, and the like. Other solvents may be used as long as they dissolve both the maleimide and citraconimide components. This liquid mixture (or varnish) is mixed with the reinforcement, by dipping, coating or the like. Any solvent is preferably removed prior to cure to avoid voids created by solvent volatilizing from partially cured resin. The hot melt process is generally preferred.

The copolymers of this invention are formed into castings or molded products by conventional processes. They can be formed into reinforced structural bodies by any of the methods known in the art including pressure forming, hand lay-up, pulltruding, filament winding, vacuum laminating and the like and the invention is not to be construed as limited to any particular forming technique.

A typical cure cycle for a copolymer might employ 110°–170° C. to remove solvent if present (or lower temperature if vacuum is applied) and 130° to 230° C. for curing. Such temperatures are lower than usually required for the bismaleimides or biscitraconimides alone. This can be shown experimentally using a differential scanning calorimeter which measures heat flow and can detect when the exothermic curing reactions take place. Experiments were carried out in such a calorimeter, and their results are given in the examples.

In general, one does not have to employ curing agents or catalysts with the present resin system. It is often desired to not have curing take place during solvent removal so as to minimize or avoid forming voids due to solvent release in the cured body or to maximize pot life of a melt in which case one would prefer to not have a catalyst present. If this is not considered a problem, as might be the case with injection molded parts, any conventional peroxide or other free-radical initiator can be employed as catalyst.

Uses of the Composites

The composites of this invention find special advantage in structures which are exposed to extreme environments. They may be formed into primary and secondary structures for aircraft, spacecraft and the like (e.g. panels, wing spars, and the like) where their high performance thermal behavior is such as to minimize fire and other risks to human life.

The invention is further described by the following Preparations and Examples. These are provided to illustrate the invention and are not to be construed as limiting its scope which is instead defined by the claims.

Preparation I: Bismaleimide of N,N'-m-Phenylenebis(m-aminobenzamide)

N,N'-m-Phenylenebis(m-aminobenzamide) 69.2 g (0.2 mole) is dissolved in 250 ml of N,N-dimethylformamide and with 39.2 g (0.4 mole) of maleic anhydride is placed in a 1000 ml Erlenmeyer flask equipped with a stirrer and water-cooling bath. The solution is stirred for 30 minutes after a white precipitate first appears. As the reaction takes place, the reaction heats. The reaction vessel is cooled to room temperature, and 5.0 g of sodium acetate and 40.8 g (0.4 mole) of acetic anhydride are added. The mixture is stirred in room temperature until all the white precipitate disappears. The resulting dark brown solution is then poured into a large quantity of water and yellow precipitate is obtained. The yellow product is washed with water until the water tests neutral. The product is filtered and dried in an oven under 30-in vacuum at 60° C. overnight. Approximately 95 g of dry product is obtained. (yield is around 90%) The nuclear magnetic resonance (NMR) spectrum shows multiplets for aromatic protons at 7.4–8.4 ppm, olefinic protons at 7.15 ppm, and amide protons at 10.4 ppm.

Preparation II. Biscitraconimide of N,N'-m-Phenylenebis(m-aminobenzamide)

N,N'-m-Phenylenebis(m-aminobenzamide) 69.2 g (0.2 mole) is dissolved in 250 ml of N,N'-dimethylformamide and together with 44.9 g (0.4 mole) of citraconic anhydride is placed in a 1000 ml Erlenmeyer flask equipped with a stirrer and a water-cooling bath. The solution is stirred for 2–3 hours. Sodium acetate (5.0 g) and 51.0 g (0.5 mole) of acetic anhydride are added to the reaction flask and the mixture is stirred at room temperature overnight. The reaction solution is then poured into a large quantity of water, and a beige precipitate is obtained. The beige product is washed with water until the water tests neutral. The product is filtered and dried in an oven under 30-in vacuum at 60° C. overnight. The yield is around 90%. Approximately 100 g of product is obtained. The NMR spectrum shows aromatic protons at 7.3–8.4 ppm, olefinic protons at 6.75 ppm, methyl protons at 2.1 ppm, and amide protons at 10.4 ppm.

Preparation III Bismaleimide of di(para-aminophenyl)methane

Di(para-aminophenyl)methane 198.2 g (1.0 moles) is dissolved in 500 ml of acetone and mixed with 196.2 g (2.0 moles) of maleic anhydride in a 2000 ml Erlenmeyer flask. The flask is stirred for 2 hours at 20° C. Then 15.0 g of sodium acetate and 250 g of acetic anhydride are added and the mixture is heated to 60° C. for 2-3 hours to form the desired bismaleimide product. The product is precipitated from water, washed and recovered by filtration and then dried. The yield is about 95%. The material gives an NMR spectra characterized by olefinic protons at 7.1 ppm, aromatic protons at 6.9–7.6 ppm, and methylene protons at 4 ppm.

Preparation IV Biscitraconimide of di(para-aminophenyl)methane

Preparation III is repeated substituting 224.1 g of citraconic anhydride for the 196.2 g of maleic anhydride. The final product, which is the biscitraconimide analogue of the product of Preparation III is obtained in 95% yield and has an NMR spectra characteristic of the desired product including a distinctive olefinic peak at 6.65 ppm and a methyl proton at 2.1 ppm.

EXAMPLE 1

A group of resins based on varying ratios of the bismaleimide of Preparation I (BMI-1) and the biscitraconimide of Preparation II (MBMI-1) are prepared and cured. In a typical preparation one part of the bismaleimide of Preparation I and an equal molar amount of the biscitraconimide of Preparation II are dissolved in dimethylformamide (DMF) and mixed thoroughly. The DMF is removed to give an intimate mixture of the two materials. The ratios employed are BMI-1:MBMI-1, 1:0, 2:1, 1:1, 1:2 and 0:1. A cure study of these materials is carried out on a DuPont differential scanning calorimeter (DSC) at 10° C./min in nitrogen. The DSC for BMI shows an endothermic melting point at about 235° C., and an exothermic cure temperature peak at 244° C. Because the melting point and the cure temperature are very close, it is difficult to process the material. MBMI-1 has a lower melting point and cure temperature than BMI-1: 147° C. and 217° C., respectively. The 1:1 mixture of the two monomers melts and cures at 142° C. and 213° C., respectively. The Figure illustrates these properties and the problems with BMI, and shows DSC thermograms for these three systems. Thermal stability and anaerobic char yield of the cured resins are measured in nitrogen using a DuPont thermogravimetric analyzer (TGA) at 10° C./min. Cured BMI-1, MBMI-1, and their 1:1 copolymer start to decompose at about 400° C., which is the typical decomposition temperature for bismaleimide. The anaerobic char yields of BMI-1 and MBMI-1 are 59% and 39.5%, respectively; the char yield of the 1:1 copolymer is 49%.

A DuPont 981 dynamic mechanical analyzer (DMA) is used to measure the glass transition temperature ($T_g$) of the cured resins in nitrogen at 5° C./min. The highly cross-linked BMI-1, after curing at 240° C. for 6 hours, has a $T_g$ of 380° C. The $T_g$ of MBMI-1 increases to 255° C. after postcuring at 240° for 16 hr. The 1:1 mixture has a moderate cross-linking density and shows a moderate $T_g$ (240° C.) after curing at 210° C. for 6 hr. A summary of the thermal properties of BMI-1, MBMI-1, and different copolymer systems is shown in Table 1. In general, the higher the BMI-1 content the higher the char yield and the higher the $T_g$. The melting point and the cure temperature of the copolymer are close to the values for MBMI-1 which are lower than those for BMI-1 itself. Thus, it can be seen that while BMI-1 itself has attractive properties, it is difficult to process because of its very similar melt and cure temperatures and that this problem can be solved without significant loss of other properties by employing the mixtures of this invention.

TABLE I

Thermal Properties of Bismaleimide (BMI-1) and Biscitraconimide (MBMI-1)

| BMI-1/ MBMI-1 molar ratio | mp (DSC peak) °C. | Cure temperature (DSC peak) °C. | Anaerobic char yield (N$_2$, 800° C.) °C. | $T_g$ before post-cure °C. | $T_g$ after post-cure °C. |
|---|---|---|---|---|---|
| 1:0 (BMI) | 235 | 244 | 58. | 380 | 385 |
| 2:1 | 155 | 230 | 50.5 | 280 | 330 |
| 1:1 | 140 | 213 | 49 | 260 | 300 |
| 1:2 | 142 | 216 | 42.5 | 240 | 280 |
| 0:1 (MBMI) | 143 | 213 | 39.5 | 170 | 255 |

EXAMPLE 2

Admixtures of BMI-1 and MBMI-1 prepared as in Example 1 are formed into graphite-cloth-reinforced composites. The physical and thermal properties of the composites are compared with those of composites made using the BMI-1 and MBMI-1 alone as well as those of baseline composites made with a commercial bismaleimide (Technochemie H-795) and a commercial epoxy (Ciba Giegy MY-720) respectively.

In a typical preparation eight harness satin-weave graphite fiber cloth prepregs are made up with a DMF or DMF-acetone (1:1) solution of the resin, and dried in a vacuum oven, (1 mm-Hg) at 100° C. for 1 hr. The dried prepreg (nine plies) is stacked and pressed between aluminum plates covered with TEFLON film. The laminate is then cured in a flat press at 200°–240° C. at a pressure of 100 psi for 5–7 hr. The laminate is not post cured. The mechanical properties of these composites is then determined.

All test specimens are cut from laminate panels. The ASTM D2344-76 procedure is used for an interlaminar short-beam shear strength test. The ASTM D790-70 procedure is used for flexural testing, and the ASTM D638-68 procedure is used for tensile properties measurement. Limiting oxygen index (LOI) is determined according to ASTM D2863-74. The results are shown in Table II for all the bismaleimide resins studied. Table 4 shows the LOI data and mechanical properties of the composites based on the BMI-1 and MBMI-1 resin systems. It can be seen that the copolymers of this invention give laminates having much better mechanical properties than do the individual bismaleimide resins.

This is especially clear with the copolymer having a 1:1 ratio. The tensile strength of the 1:1 copolymer at elevated temperature (350° F.) is similar to that at ambient temperature.

Table II also contains (for comparison) properties of two baseline laminates. These baseline materials are considered to be representative of the bismaleimide and epoxy based materials presently of interest in the aircraft industry. They are made from a commercial bismaleimide (Technochemie H795) and a commercial epoxy (Ciba Geigy MY-720) respectively. As can be seen in Table II, the mixtures of this invention provide composites having fire-resistance properties essentially equal or better than composites based on the H-795 bismaleimide with strength properties in many tests far superior to the composites based on the MY-720 epoxy.

TABLE IV

Physical and Mechanical Properties of Composites Made From BMI-2 and MBMI-2 Materials

| Mechanical and Physical Properties | BMI-2/MBMI-2 molar ratio | | | | | |
|---|---|---|---|---|---|---|
| | 1:0 | 3:1 | 2:1 | 1:1 | 1:2 | 1:3 |
| Resin content, % | 28.0 | 20.3 | 23.2 | 21.0 | 22.1 | 23.9 |
| LOI, % | 65.4 | 63.0 | 60.0 | 62.7 | 64.0 | 63.1 |
| Short-beam shear (room temp.), ksi$^a$ | 2.60 | 3.73 | 4.11 | 4.32 | 5.27 | 3.01 |
| Flexural (room temp.) | | | | | | |
| Strength, ksi$^a$ | 41.67 | 72.74 | 76.95 | 86.56 | 87.71 | 45.37 |
| Modulus, Msi$^b$ | 9.24 | 10.37 | 9.16 | 10.69 | 10.29 | 9.22 |
| Energy, ft lb/in.$^3$ | 6.04 | 15.27 | 19.73 | 21.90 | 22.95 | 6.90 |
| Tensile (room temp.) | | | | | | |
| Strength, ksi$^a$ | 66.0 | 51.3 | 70.6 | 72.2 | 76.3 | 76.0 |
| Modulus, Msi$^b$ | 2.6 | 2.0 | 1.7 | 2.3 | 2.3 | 2.7 |
| Elongation, % | 4.5 | 4.4 | 4.6 | 4.3 | 4.5 | 4.7 |

$^a 1 \times 10^3$ lb/in.$^2$.

TABLE II

Mechanical Properties of BMI-1 & MBMI-1 Copolymers

| Mechanical Properties | BMI-1 (100%) | Ratio (BMI-1/MBMI-1) | | | | | MBMI-1 (100%) | H795$^a$ | MY720$^b$ |
|---|---|---|---|---|---|---|---|---|---|
| | | 4/1 | 3/1 | 2/1 | 1/1 | 1/2 | | | |
| Resin content, % | 41.0 | 32.3 | 26.7 | 31.9 | 28.5 | 23.2 | 21.5 | 22.0 | 22.0 |
| $T_g$, °C. | 395. | 340. | 328. | 290. | 257. | — | 200. | 420. | 265. |
| Char Yield at 800° C. in N$_2$, % | 58.0 | 50.5 | 51.0 | 48.0 | 45.5 | — | 39.5 | 48.5 | 34. |
| LOI, % | 65.0 | 64.7 | 66.3 | 59.3 | 64.0 | 69.0 | 64.6 | 59. | 45. (65.) |
| Short beam Shear R.T. (KSI) | 1.80 | 4.67 | 5.07 | 4.93 | 4.95 | 5.10 | 4.84 | 2.20 | (7.78) |
| Flexural, R.T.$^c$ Strength, (KSI) | 56.40 | 71.55 | 73.62 | 81.45 | 109.25 | 86.7 | 105.21 | 53.76 | 81.02 (79.8) |
| Modulus (MSI) | 7.28 | 8.61 | 8.24 | 8.74 | 9.43 | 10.75 | 11.60 | 9.23 | 10.25 (6.8) |
| Energy (ft-lb/in$^3$) | 13.91 | 19.48 | 20.38 | 24.52 | 35.74 | 20.15 | 27.32 | 9.71 | 20.69 |
| Tensile, R.T.$^d$ Strength (PSI) | 64.0 | 84.3 | 73.3 | 100.2 | 150.0 | 81.3 | 96.0 | 77.0 | 40. (51.6) |
| Modulus | 1.3 | 2.0 | 2.3 | 2.0 | 1.9 | 2.3 | 2.4 | 2.8 | 2.5 (4.4) |
| Elongation (%) | 6.5 | 5.9 | 4.8 | 6.4 | 5.0 | 4.5 | 5.0 | 4.5 | 3.8 (2.1) |

Notes
$^a$Batch KT 148;
$^b$Epoxy: MY 720 cured DDS;
$^c 1 \times 10^3$ lb/in$^2$;
$^d 1 \times 10^6$ lb/in$^2$

EXAMPLES 3 and 4

Examples 1 and 2 are repeated using as resin components the bismaleimide (BMI-2) of Preparation III and the biscitraconimide (MBMI-2) of Preparation IV. The thermal and mechanical properties of the resulting copolymers and composites containing the copolymers are determined and compared with those of the individual BMI-2 and MBMI-2 materials. These results are presented in Tables III and IV and again illustrate the advantages of the present invention.

TABLE III

Thermal Properties of the BMI-2 and MBMI-2 System

| BMI-2/MBMI-2 molar ratio | Cure temperature (DSC peak), °C. | Anaerobic char yield (N$_2$, 800° C.), % | $T_g$, °C. |
|---|---|---|---|
| 1:0 | | 53 | 400 |
| 3:1 | 258 | 44 | 372 |
| 2:1 | 254 | 43 | 348 |
| 1:1 | 240 | 37.5 | 318 |
| 1:2 | 227 | 33 | 318 |
| 1:3 | 216 | 33 | 160 |

$^b 1 \times 10^6$ lb/in.$^2$.

While only a few embodiments of the invention have been shown and described herein, it will be apparent to those skilled in the art that various modifications and changes can be made in the copolymers, composites and panels described herein without departing from the spirit and scope of the present invention. All such modifications and changes coming within the scope of the appended claims are intended to be covered thereby.

What is claimed is:

1. A cured copolymeric resin, having improved physical and chemical properties compared to a resin comprising a single bismaleimide, which resin is formed by curing an admixture comprising a bismaleimide of the structure:

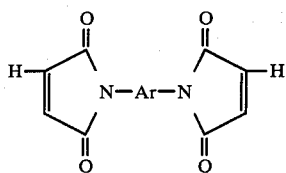

and a substantially equimolar amount of biscitraconimide of the structure:

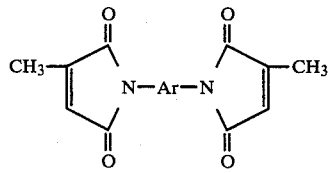

wherein Ar is an arylene, wherein the molar ratio of bismaleimide to biscitraconimide is between about 2:1 and 1:2.

2. The cured resin of claim 1 wherein the molar ratio of bismaleimide to biscitraconimide is about 1:1.

3. The cured copolymeric resin of claim 1 wherein Ar is selected from phenylene, diphenylene, bis(phenylene)methane, diphenylene sulfone, oxyphenylene and amide-linked polyaromatics.

4. The cured copolymeric resin of claim 1 wherein Ar is bisphenylene methane.

5. The cured copolymeric resin of claim 1 wherein Ar is a phenylene-benzamide.

6. A cured copolymeric resin, having improved physical and chemical properties compared to a resin comprising a single bismaleimide, which resin is formed by curing an admixture of bismaleimide of the structure:

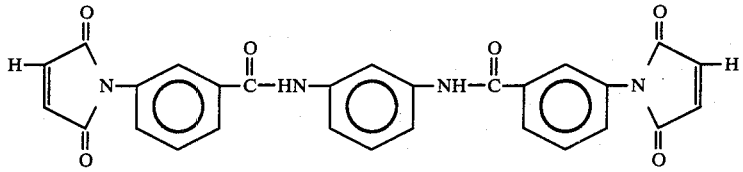

and a substantially equimolar amount of citraconimide of the structure:

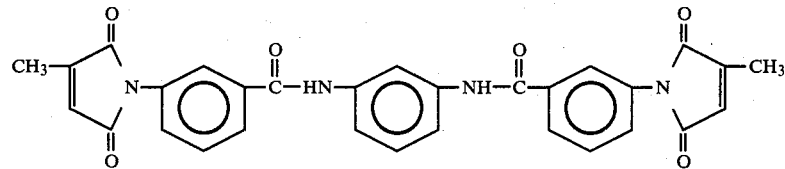

wherein the molar ratio of said admixture of bismaleimide to biscitraconimide is between about 2:1 and 1:2.

7. The cured resin of claim 6 wherein the molar ratio about 1:1.

8. A reinforced resin composite comprising 0.5 to 5 parts of reinforcing fiber dispersed in one part by weight of the cured copolymeric resin of claim 1.

9. A reinforced resin composite comprising 0.5 to 5 parts of reinforcing fiber dispersed in one part of the cured copolymeric resin of claim 1.

10. A reinforced resin composite comprising 0.5 to 5 parts of reinforcing fiber dispersed in one part of the cured copolymeric resin of claim 6.

11. The reinforced resin composite of claim 10 wherein the reinforcing fiber is selected from the group consisting of carbon fibers, glass fibers and aramide fibers.

12. The reinforced resin composite of claim 8 wherein the reinforcing fiber is carbon fiber.

13. The reinforced resin composite of claim 11 wherein the reinforcing fiber is carbon fiber.

14. An aircraft structural panel comprising the reinforced resin composite of claim 8.

15. An aircraft structural panel comprising the reinforced resin composite of claim 13.

* * * * *